United States Patent

[11] 3,557,300

[72] Inventor Frithjof Werner
Stuttgart-Zuffenhausen, Germany
[21] Appl. No. 740,743
[22] Filed June 27, 1968
[45] Patented Jan. 19, 1971
[73] Assignee Robert Bosch GmbH
Stuttgart, Germany
a limited liability Company of Germany
[32] Priority July 1, 1967
[33] Germany
[31] No. B93279

[54] SUPPORT AND INTERCONNECTION ARRANGEMENT FOR SEMICONDUCTOR RECTIFIERS IN ALTERNATOR STRUCTURES

4 Claims, 3 Drawing Figs.

[52] U.S. Cl. .......... 174/68.5, 29/626; 317/101; 321/8; 339/17
[51] Int. Cl. .......... H05k 1/18
[50] Field of Search .......... 174/75, 68, 84, 94; 317/101C, 101CC; 339/17, 220, 221, 217, 275; 29/625, 626; 310/68; 321/8

[56] References Cited

UNITED STATES PATENTS

| | | | |
|---|---|---|---|
| 3,065,524 | 11/1962 | Donnell et al. | 339/176UX |
| 2,969,521 | 1/1961 | Scoville | 339/220 |
| 3,123,664 | 3/1964 | Logan | 339/220X |
| 3,250,928 | 3/1966 | Bates | 310/68 |
| 3,422,339 | 1/1969 | Baker | 321/8 |

OTHER REFERENCES

Buhler, German App. No. 1,093,846, pub. 12-1-60, class 174-75

*Primary Examiner*—Darrell L. Clay
*Attorney*—Stephen H. Frishauf

ABSTRACT: To interconnect the output windings of automotive type alternators with rectifiers, and other circuits placed on an insulating circuit board, a connection element is mounted through an opening in the circuit board, the connection element being formed as a hollow cylindrical body having a flange intermediate its length, which may connect with a printed circuit and bearing against one side of the board, a second flange, for example formed by peening over the end of the body to grip the other side of the board; the connector is slit lengthwise, and an alternator output conductor is clamped in the slit, as well as a rectifier pin of lesser diameter than the cylindrical body passed axially through the element, the element being deformed to hold all conductors together; additionally, the joint may be soldered.

INVENTOR
Frithjof WERNER
By

[signature]

his ATTORNEY

SUPPORT AND INTERCONNECTION ARRANGEMENT FOR SEMICONDUCTOR RECTIFIERS IN ALTERNATOR STRUCTURES

The present invention relates to a connection element to connect an electrical conductor with a board, for example a connection board or a printed circuit board, and more particularly to a connection element to be mounted as part of the structural assembly of an automotive alternator to interconnect a rectifier element and the conductor from an output winding of the alternator.

Various electrical networks require a simple interconnection of one electrical component with another. Alternators for automotive use must have their copper wires, usually coming directly from the armature windings, connected to semiconductor rectifier assemblies, usually consisting of a number of individual rectifier units. Such interconnections must meet various requirements: they must be simple to be made, must have a long life, and further must be immune to vibration and shocks expected in automotive applications. Additionally, connections with printed circuits must be possible, likewise readily made and resistant to shock and vibration.

It has been found that direct soldering of the elements of a printed circuit to connection leads for rectifiers and alternators is usually not practicable, since the printed circuit conductors are very thin and cannot withstand mechanical, and particularly dynamic stresses. Interconnection of a wire with a pin-type connecting element, which is the usual connection to a semiconductor rectifier unit may cause difficulties in mass production, particularly if soldered joints are used, since preliminary preparations are necessary in order to ensure a secure and sturdy connection. Such preliminary preparations of the joints are wasteful of time and interfere with mass production.

It is an object of the present invention to provide an arrangement for a durable, yet inexpensive interconnection resistant to vibration and shocks, which is particularly suitable for automated manufacture.

Subject matter of the present invention:

Briefly, in accordance with the present invention, the alternator has a board secured thereto, such as a printed circuit, which is formed with a perforation. A hollow cylindrical sleevelike element having an inner diameter larger than the outer diameter of a rectifier pin extends through the perforation for a portion of its length, and therebeyond, and is formed with a pair of shoulders which seat against opposite sides of the board. An axial portion extends beyond the board itself. The board may be formed with printed circuits thereon interconnecting with one or both of the shoulders of the interconnecting element. Electrical conductors can be connected with the interconnecting element in various ways, for example by passing the connecting conductor axially into the interconnecting element and soldering the conductor and the element together at the extending portion thereof.

In accordance with a feature of the invention, a particularly simple connection can be made by forming an axial slot in the extending portion, and deforming the extending portion by squeezing the parts next to the slot together so as to clamp any axially extended conductor such as a rectifier pin between the deformed pieces, for secure holding and, if desired, subsequent soldering.

Wires extending from the alternator structure itself may be passed transverse to the axial extent of the connecting element into the slots, prior to their deformation, so that upon deformation the alternator conductors, as well as the pin-type conductors from the rectifiers and the element are all crimped together in one operation and, if desired, can be soldered together subsequently.

Alternating current generators, and particularly three-phase generators, in combination with the connection element of the present invention are particularly adapted to supply direct current output, the board consisting of insulating material and located within the generator, the pin-type axial conductor forming one line to a rectifier element and the conductor extending into the slot forming an output winding of the generator. Such a semiconducting rectifier array can readily be mounted on a suitable carrier, for example on a heat sink. It is a simple, short manufacturing step to interconnect the pin-type connector of the semiconductor rectifiers with the output windings of the generator by utilizing the connection elements on the plate. The pin-type connections from the semiconductor rectifiers may be introduced into the hollow cylindrical portions of the connection elements automatically, and soldering of the output windings of the generators to the connections with the semiconductor rectifiers can be carried out in a single manufacturing step. The projecting portions of the connection elements enable interconnection of all the conductors by introducing the entire assembly into a solder pot which is brought towards the board from below.

The structure, organization, and operation of the invention will now be described more specifically with reference to the accompanying drawings, wherein.

Figure 2:
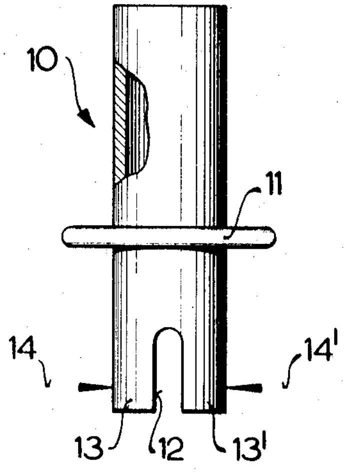
FIG. 2 is front view, partly broken away, of the interconnecting element before assembly.

The connecting element consists of a hollow, cylindrical, tubular sleevelike part 10 having an intermediate shoulder 11 formed thereon, as best seen in FIG. 2. The shoulder 11, which may be made by forming a deformation or ridge on the tube 10 is adapted to bear against one side of the board. One end of the element 10 is formed with a pair of slots or grooves 12. The two wall portions 13, 13' adjacent the slots 12 may be deformed under a force, indicated schematically by arrows 14, 14', to pinch the end of the element 10 together.

Figure 1:
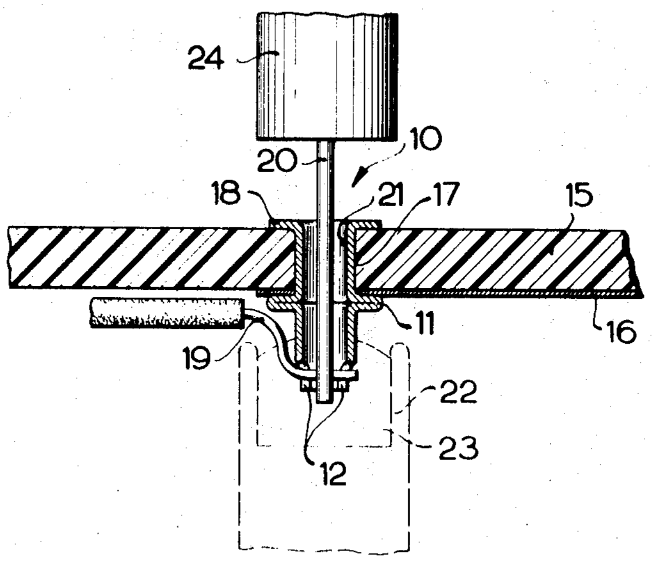
FIG. 1 is a cross-sectional view of a connection board, and a connection element, with a printed circuit, a generator output conductor and a rectifier in substantially enlarged scale.

The element can be assembled to a flat platelike base 15, which may be part of an insulating board, having an electrical conductor 16 applied thereto which may be part of a printed circuit (see FIG. 1). In order to secure the connecting element 10 to such a platelike board 15, it is passed through a perforation 17 therein, which perforation preferably extends through one of the conductors 16. The element 10 is then inserted into the perforation so that the ridge or shoulder 11 bears against conductor 16 to form a conductive connection. The upper edge of the conductive element 10 is then peened, or crimped over so that a second shoulder 18 is formed against the top side of the board 15, as best seen in FIG. 1. Plate 15 is thus securely held between the shoulders 11 and 18, thus securing connecting element 10 rigidly to plate 15. The electrical connection to conductor 16 is both mechanically as well as electrically durable and vibration resistant. If desired, a solder connection may be formed by dip-soldering to further improve the connection, and its permanency; it has been found, however, that even without soldering very low connection resistances are obtained.

FIG. 1 illustrates connection of a conductor 19 in the slot 12, and connection of a pin-type conductor 20 of a semiconductor rectifier 24 in the internal axial opening 21 of the connection element 10. Conductor 19 is first placed into slots 12, and then conductor 20, is inserted axially through element 10. As best seen in FIG. 1, the inner diameter of opening 21 is larger than the outer diameter of conductor 20 to provide for clearance between opening 21 of sleevelike element 10 and the conductor 20. Wall portions 13, 13' are then deformed in order to pinch and clamp wires 19, 20 together and into the connecting element. Thereafter, the wires and the connecting element are dipped into a solder bath 23 within a solder pot 22 (shown in broken lines in FIG. 1), thus securely connecting conductors 19, 20 with the connecting element and thus with conductor 16, both electrically as well as mechanically. FIG. 1 illustrates conductor 16 at the bottom side of the board 15; it could, of course, also be mounted on the top side, or an additional conductor can be mounted on the top, to be interconnected by the shoulder 18 with the conductor at the bottom, and such other conductors as are connected to element 10.

Figure 3:
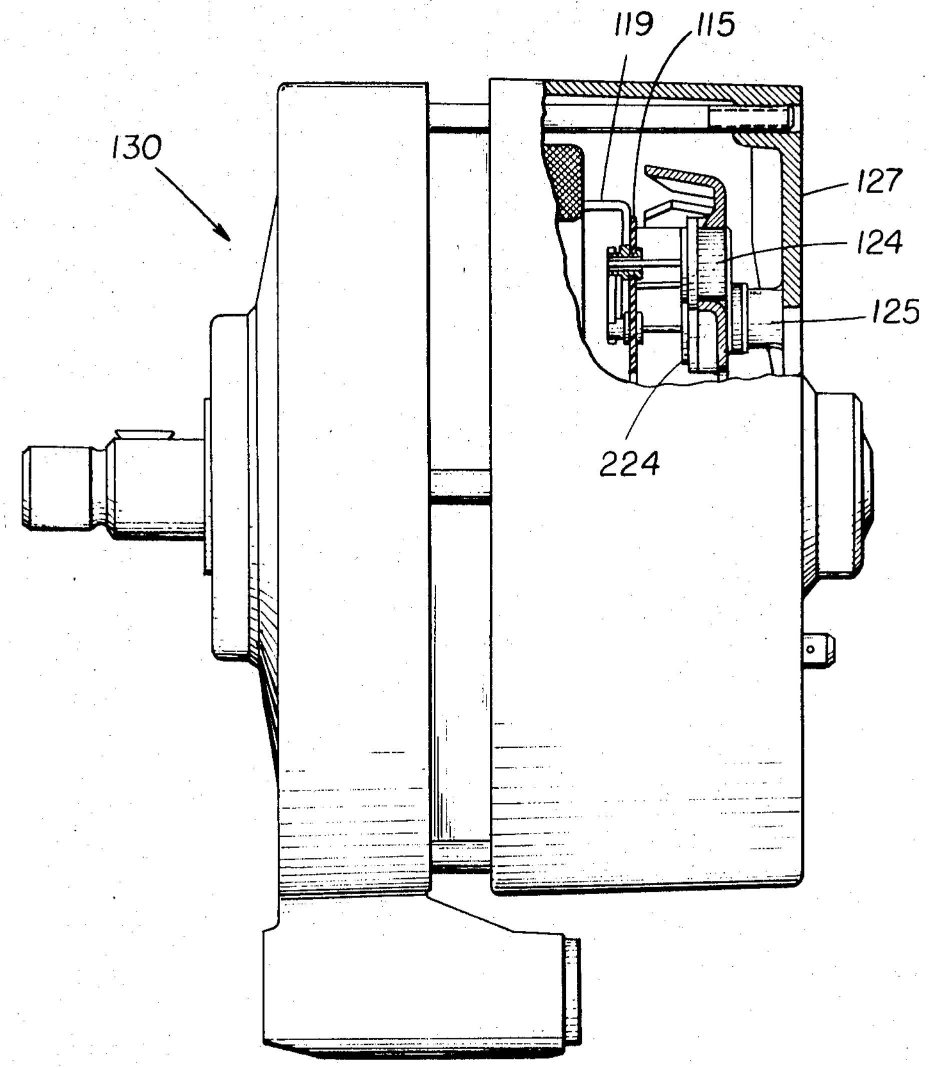
FIG. 3 is a schematic view of an alternating current generator (alternator assembly) using a circuit board in accordance with the present invention.

The pin-type connection of semiconductor rectifier 24, extending axially through the tubular element 10 forms an effective connection with the output winding of an automotive type alternator, and particularly, when the rectifiers are connected in a rectifier array to provide direct current to feed the battery of a vehicle. Referring now to FIG. 3, a plate 115 is secured to a heat sink 127, and the heat sink is secured by means of screws (not shown) and stand-offs 125 to the frame of a three-phase generator 130. Six rectifiers, of which two rectifiers 124, 224 are shown in FIG. 3, are connected to respective output leads of the generator, indicated schematically at 119 and connected directly from the alternator to the rectifier array. The heat sink 127 also serves as a DC output for the generator assembly in a manner well known to those skilled in the art. Connection elements 110, 210 are provided in the plate 115 to interconnect the pin-type conductors 120, 220 of the respective rectifier elements 124, 224 with the respective output leads of the generator. These connections are soldered, as more clearly shown in FIG. 1.

While the embodiments of the present invention as herein disclosed, constitute preferred forms, it is to be understood that other forms might be adopted.

I claim:

1. A device for supporting and interconnecting an electrical element having a connecting pin to a perforate connection board of insulating material, and for further interconnection of said connecting pin with a conductor comprising:

a hollow cylindrical connection sleeve inserted in a perforation of said board, said connection sleeve being formed with a pair of shoulders which engage the upper and lower faces, respectively, of said board, at least one of said shoulders being located intermediate the length of said connection sleeve with at least a portion of said sleeve extending beyond said board, said sleeve having an inner diameter greater than the outer diameter of the connection pin of said electrical element;

a transverse slot formed in the portion of said sleeve extending beyond said board and separating said extending portion of said sleeve into cylindrical sectors, said slot being adapted to receive said conductor;

said pin of said element extending longitudinally into said hollow connection sleeve with clearance, and said conductor extending transversely of said sleeve and through said slot, said pin and said conductor being secured to said sleeve at said extending portion of said sleeve, said cylindrical sectors of said extending portion of said sleeve being deformed to mechanically and electrically secure said pin and said conductor to said sleeve and to provide for mechanical support of said electrical element; and said conductor, said pin and said cylindrical sectors being soldered together.

2. The device according to claim 1, including a printed circuit conductor formed on said board and conductively interconnected with at least one of said shoulders.

3. The device according to claim 2, wherein said conductor, said pin, said printed circuit conductor, and said extended portion of said sleeve are soldered together.

4. The device according to claim 2 wherein said printed circuit conductor lies under said at least one shoulder to which it is interconnected.